No. 801,641. PATENTED OCT. 10, 1905.
G. H. BOETCHER.
INJECTOR.
APPLICATION FILED JAN. 4, 1905.
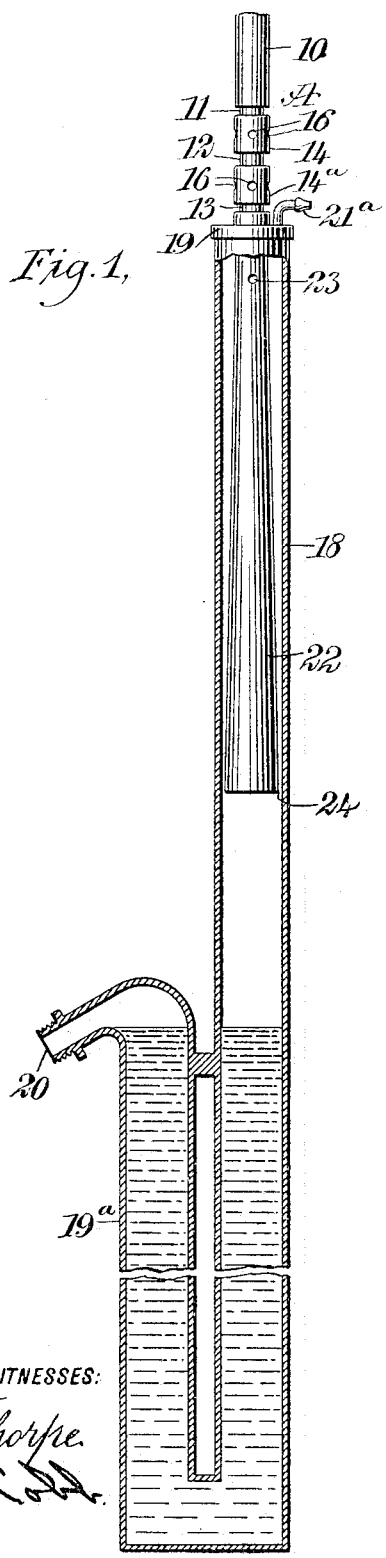
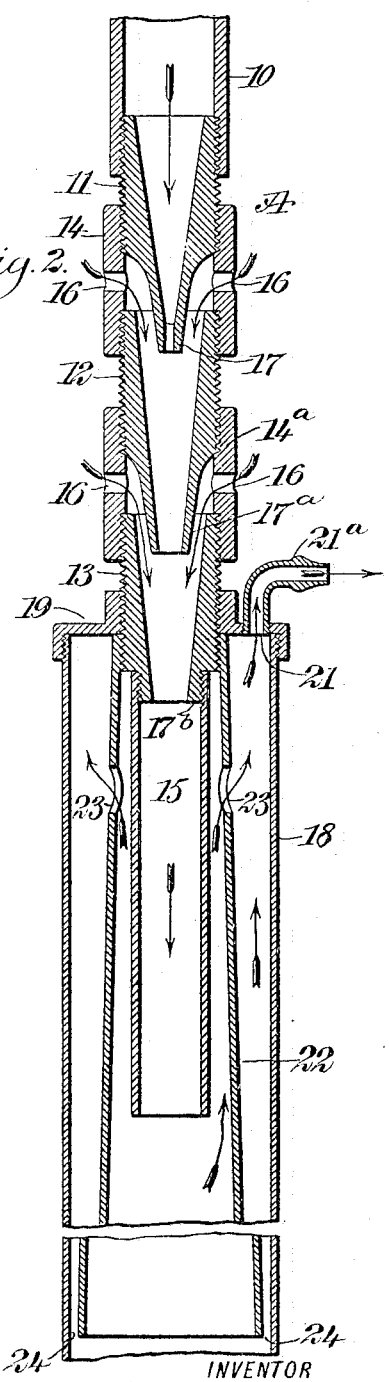
WITNESSES:
Edw. Thorpe.
S. H. Cobb.
INVENTOR
George H. Boetcher
BY
ATTORNEYS

UNITED STATES PATENT OFFICE.

GEORGE H. BOETCHER, OF CAMBRIDGE, OHIO.

INJECTOR.

No. 801,641. Specification of Letters Patent. Patented Oct. 10, 1905.

Application filed January 4, 1905. Serial No. 239,551.

*To all whom it may concern:*

Be it known that I, GEORGE H. BOETCHER, a citizen of the United States, and a resident of Cambridge, in the county of Guernsey and State of Ohio, have invented a new and Improved Injector, of which the following is a full, clear, and exact description.

My invention relates to injectors, and has for its principal objects the provision of a simple and efficient device for supplying under pressure such fluids as air.

It consists in the various features and combinations hereinafter described and more particularly claimed.

Reference is to be had to the accompanying drawings, forming a part of this specification, in which similar characters of reference indicate corresponding parts in both the views.

Figure 1 shows one embodiment of my invention, partly in elevation and partly in vertical section; and Fig. 2 is a central vertical section in the plane of the air-outlet from the casing.

A designates a conduit, which is preferably formed in sections, there being a pipe 10, leading from a source of liquid under suitable head or pressure, externally-threaded sections 11, 12, and 13, connected by couplings 14 14$^a$, and a lower delivery portion 15. In each of the couplings are lateral openings 16, and projecting into the conduit past these openings from the sections 11 and 12 are nozzles 17 and 17$^a$, respectively, while the section 13 is tapered to form a nozzle 17$^b$. The jet-openings of these nozzles are of gradually-increasing diameter as they go from the liquid-supply pipe 10. The section 13 is shown as extending into a casing 18, which may include a head 19, closing its upper end and conveniently being threaded upon the section. The casing preferably terminates in an upturned portion 19$^a$, which furnishes a trap adapted to contain a body of water. At the upper end of this portion 19$^a$ is a liquid-discharge opening 20, and through the head of the casing is shown an air-discharge opening 21, which may be provided with a connecting-pipe 21$^a$, to which a hose may be attached. Surrounding the section 15 of the conduit, within the casing and conveniently supported by being threaded upon the section 13, is a sleeve 22, which has a suitable number of lateral openings 23. This sleeve preferably flares downwardly or outwardly until its extremity is in close proximity to the wall of the casing, leaving a narrow annular space 24.

In use the liquid which is to operate the injector, usually water at atmospheric temperature, is supplied through the pipe 10 under the necessary pressure. As it is ejected from the nozzle 17 its flow introduces an inward current of air through the openings in the coupling 14, this air mingling with the water and being carried through the nozzle 17$^a$. This and the succeeding nozzle 17$^b$ are of such diameters that the jet breaks into a spray, which effectively entrains the air which it causes to flow in through the openings in the coupling 14$^a$. The mixed air and liquid then pass through the delivery portion 15 of the conduit, through the sleeve, and into the casing. As they descend the air separates from the water and, rising through the openings 23 and the annular opening 24, escapes under pressure through the discharge-pipe 21$^a$, it being prevented from passing on with the water by the body held within the trap portion of the casing. As this water accumulates in the trap it flows off through the opening 20. By a hose attached to the discharge-pipe 21$^a$ the air may be conveyed to any desired point and employed, for example, to operate a blow-pipe or any other device requiring a comparatively light blast. The contracted opening at 24 tends to prevent a back rush of the water through the air-discharge opening in event of the supply of water being abruptly stopped, with the consequent lessening of the air-pressure in the casing, which lessening is due to part of the compressed air in casing 18 escaping back into the atmosphere.

Having thus described my invention, I claim as new and desire to secure by Letters Patent—

1. An injector comprising a nozzle, a conduit into which the nozzle extends and which is provided with an opening beside said nozzle into the outer air, a casing adapted to contain a body of liquid and having a liquid-discharge opening and an air-discharge opening and into which the conduit extends, and a sleeve surrounding the end of the conduit within the casing and being provided with an opening at the side of the conduit end.

2. An injector comprising a nozzle, a conduit into which the nozzle extends and which is provided with an opening beside said nozzle into the outer air, a casing adapted to contain a body of liquid and having a liquid-discharge opening and an air-discharge opening and into which the conduit extends, and a sleeve surrounding the end of the conduit within the
5 casing and flaring outwardly into close proximity with the casing and being provided with an opening at the side of the conduit end.

In testimony whereof I have signed my name to this specification in the presence of two subscribing witnesses.

GEORGE H. BOETCHER.

Witnesses:
W. F. PADGITT,
G. D. DUGAN.